US012434207B2

(12) United States Patent
Raymus

(10) Patent No.: US 12,434,207 B2
(45) Date of Patent: *Oct. 7, 2025

(54) MIXING DEVICE

(71) Applicant: TRRS MAGNATE, LLC, Manteca, CA (US)

(72) Inventor: Thomas Anthony Raymus, Manteca, CA (US)

(73) Assignee: TRRS MAGNATE, LLC, Manteca, CA (US)

(*) Notice: Subject to any disclaimer, the term of this patent is extended or adjusted under 35 U.S.C. 154(b) by 596 days.

This patent is subject to a terminal disclaimer.

(21) Appl. No.: 17/945,858

(22) Filed: Sep. 15, 2022

(65) Prior Publication Data

US 2023/0294051 A1 Sep. 21, 2023

Related U.S. Application Data

(63) Continuation-in-part of application No. 17/700,080, filed on Mar. 21, 2022.

(51) Int. Cl.
*B01F 33/501* (2022.01)
*B01F 31/44* (2022.01)

(52) U.S. Cl.
CPC ........ *B01F 31/44* (2022.01); *B01F 33/50111* (2022.01)

(58) Field of Classification Search
CPC .................. B01F 33/254; B01F 33/50111

USPC ................................................ 366/130, 342
See application file for complete search history.

(56) References Cited

U.S. PATENT DOCUMENTS

| | | | | |
|---|---|---|---|---|
| 653,233 A | * | 7/1900 | Godward | B01F 33/5011 366/130 |
| 1,060,419 A | * | 4/1913 | Benjamin | B01F 33/5011 D7/300.1 |
| 1,931,087 A | | 10/1933 | Schwarz | |
| 3,136,532 A | * | 6/1964 | Rudnick | B01F 33/5011 366/130 |
| 7,441,941 B2 | * | 10/2008 | Vernon | A47J 43/10 366/130 |
| 9,643,141 B2 | * | 5/2017 | Kershaw | B01F 23/40 |
| 9,706,880 B1 | | 7/2017 | Kalamaras | |
| 10,588,463 B2 | | 3/2020 | Enghard | |

* cited by examiner

*Primary Examiner* — David L Sorkin
(74) *Attorney, Agent, or Firm* — Boris Leschinsky

(57) ABSTRACT

A new mixing device for mixing solids and medium to highly viscous food ingredients with liquid in a shaker bottle. The mixing device has an agitator with a center portion and distal portions of larger diameter than the center portion. The agitator is insertable within a hand-held, shakeable container. The agitator is composed of a framework arranged to provide voids to allow for flow of liquids, powders, and other materials into and out of portions of the agitator. The mixing device also has a weighted member attached adjacent to or within the center of the agitator that increases the momentum of the mixing device when in operation. The weighted member may have a metal core and polymer exterior.

14 Claims, 13 Drawing Sheets

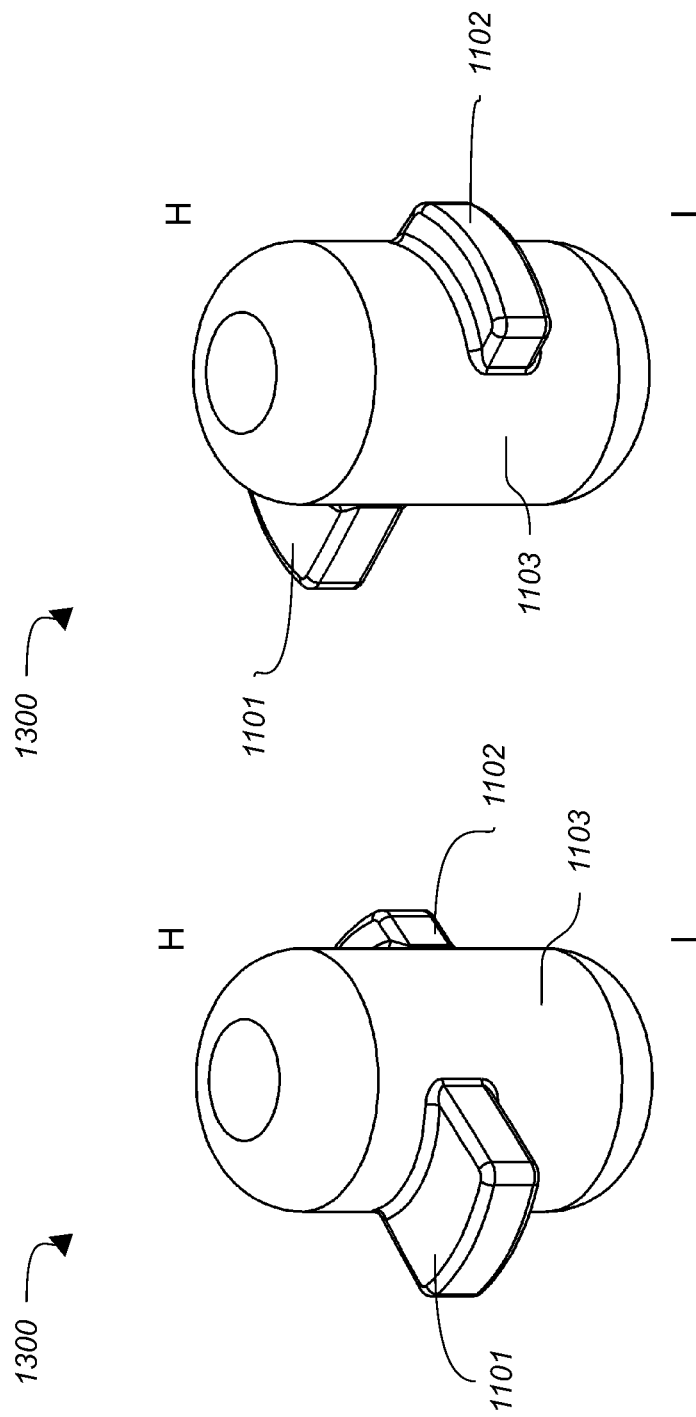

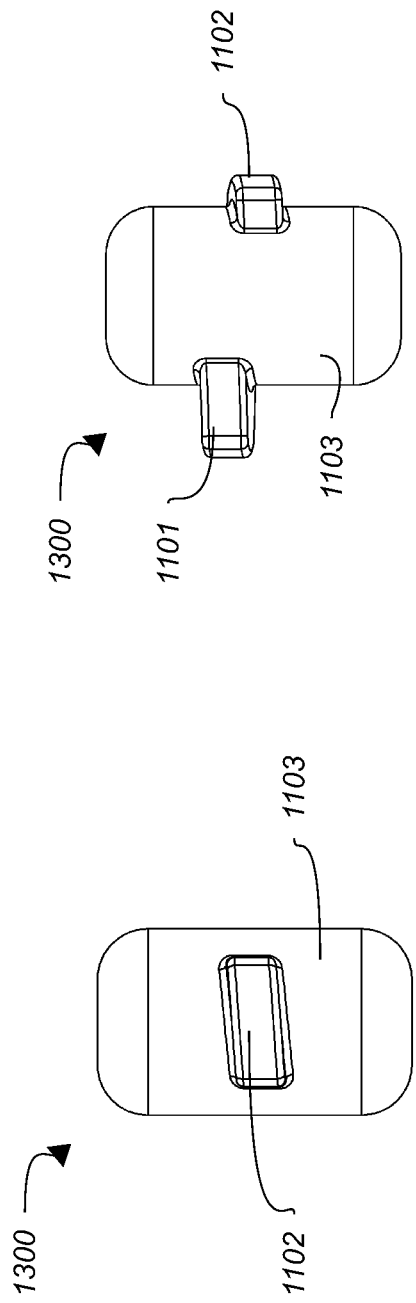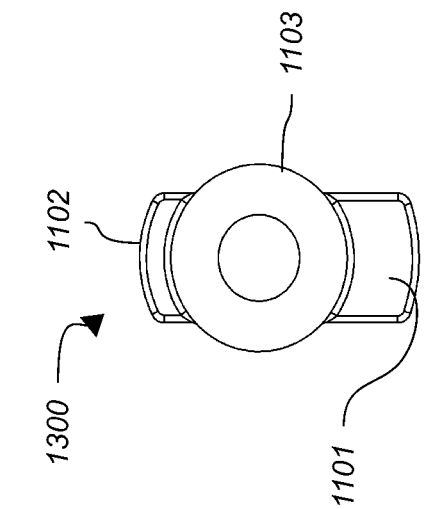

MIXING DEVICE

RELATED APPLICATIONS

This application is a continuation-in-part of application Ser. No. 17/700,080, filed on Mar. 21, 2022, and claims priority thereto.

BACKGROUND

People of all walks of life use shaker bottles to mix, shake, and drink protein and other supplements. For many, it is a ritual to put their preferred supplements and liquids in a shaker bottle, shake vigorously, and drink, anticipating important health benefits. As more people become health aware and participate in exercise and sporting events, the use of shaker bottles continues to increase. Because shaker bottles are ubiquitous, it is easy to forget that their advent and popularity is relatively recent and that, therefore, design options and functionality somewhat limited. Significantly, the increased adoption of shaker bottles also spawns evolving consumer desire for variety, broadened functionality, and increased efficiency. For example, some users want to increase the variety of their drinks and supplements by adding food ingredients like fruits (e.g. bananas), vegetables (e.g., avocado), thick dressings, and/or cake batters.

Unfortunately, contemporary shaker bottles are ill-suited to effectively mix compositions that include solid or even medium-to-high viscosity food ingredients. More particularly, most shaker bottles use free-floating agitator or fixed separator designs with frameworks and voids for mixing ingredients. In large part, these designs were engineered to adequately mix low viscosity liquids (like water, milk, or juice) with one or more powdered supplements. Free-floating agitators are too lightweight and have too much drag to achieve the momentum necessary to mix solid ingredients or those resulting in a higher mass, viscosity, and/or volume within the container. Additionally, the efficacy of fixed separators to mix such ingredients is limited by separator positioning and design, container fill level and travel, and other variables. Accordingly, attempts to mix the type of ingredients mentioned above in contemporary shaker bottles results in a chunky, poorly mixed messes that may not make it through the lid for user consumption, or, even if they do fit through the lid, must be chewed by a user for consumption.

What is needed is a new category of mixing device for shaker bottles that is capable of effectively mixing denser food ingredients through the traditional shake and drink methods shaker bottle users are accustomed to. Such a mixing device would dramatically expand mixed-drink types for users without having to resort to the powered and other mixer types typically required.

SUMMARY OF THE INVENTION

In accordance with the above, a new mixing device is provided comprising: an agitator with a center portion and distal portions of generally larger diameter than the center portion. The agitator is insertable within a hand-held, shakeable container. The agitator is composed of a framework arranged to provide voids to allow for flow of liquids, powders, and other materials into and out of portions of the agitator. The mixing device has a weighted member attached adjacent the center of the agitator. The weighted member may have a metal core and polymer exterior.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which:

FIG. 13 is a first perspective view of a fifth embodiment of a mixing device with weighed member.

FIG. 14 is a second perspective view of a fifth embodiment of a mixing device with weighted member.

FIG. 15 is a first side view of a fifth embodiment of a mixing device with weighted member.

FIG. 16 is a second side view of a fifth embodiment of a mixing device with weighted member.

FIG. 17 is a top view of a fifth embodiment of a mixing device with weighted member.

DETAILED DESCRIPTION OF THE ILLUSTRATED EMBODIMENT

Figure 1:
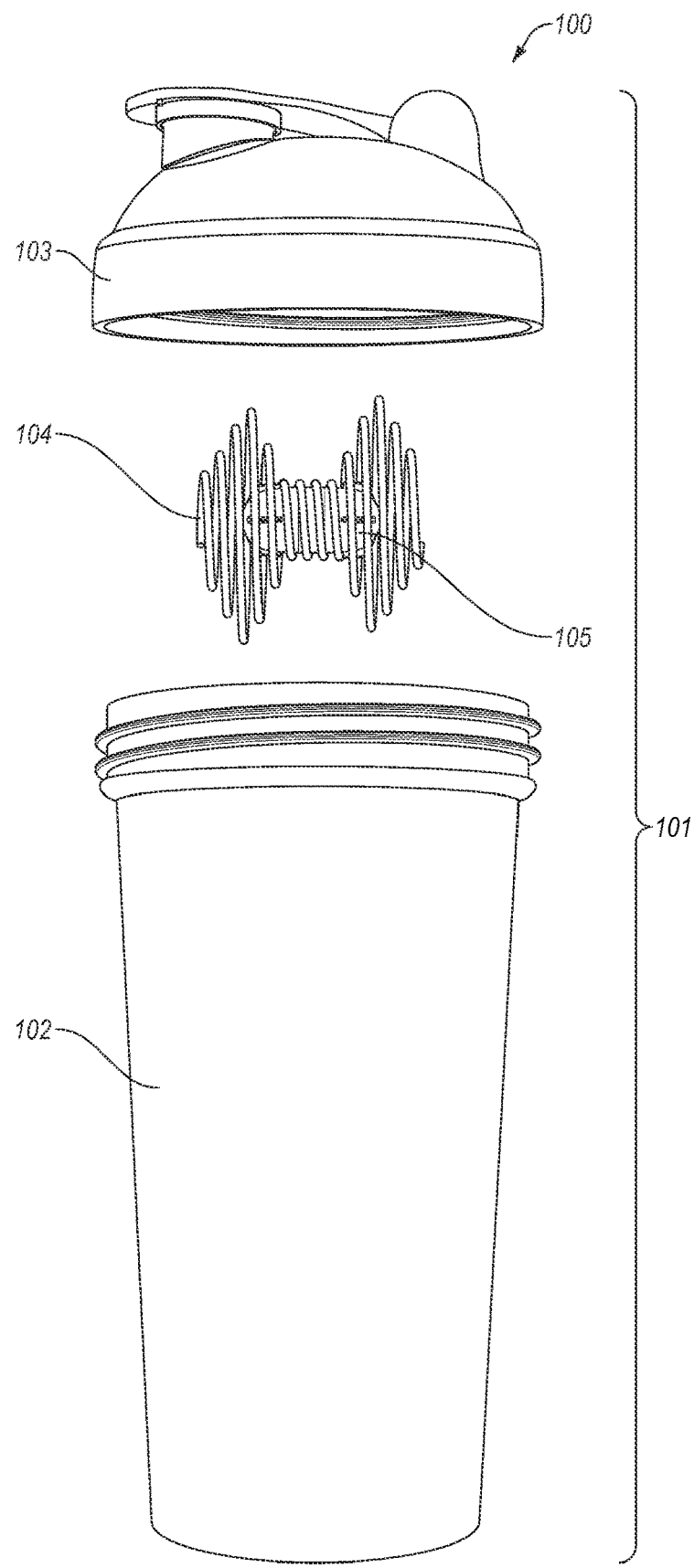
FIG. 1 is an exploded view of one embodiment of a mixing device with a container, agitator, and weighted member.

The present invention in its various embodiments, some of which are depicted in the figures herein, is a mixing device. Referring now to FIG. 1, a first embodiment of a mixing device 100 is shown. This mixing device 100 may include a container 101 for holding liquids comprising a lower cup or bottle portion 102 and releasably attachable lid portion 103. Container 101 is configured to be hand-held and shakable. The mixing device 100 may also include a dumbbell-shaped agitator 104 that is insertable within the container 101 and composed of a framework arranged to provide voids to allow for the flow of liquids, powders, and other materials, such as, for example, fruit and vegetable pieces, into and out of portions of the agitator 104. Mixing device 100 includes a weighted member 105 that is releasably attached to the agitator 104 adjacent to or within the center of the agitator 104. In other embodiments, the mixing device 100 may omit the container 101, but include the agitator 104 and weighted member 105. In still other embodiments, the mixing device 100 may omit both the container 101 and the agitator 104 and include only the weighted member 105.

Figure 2:
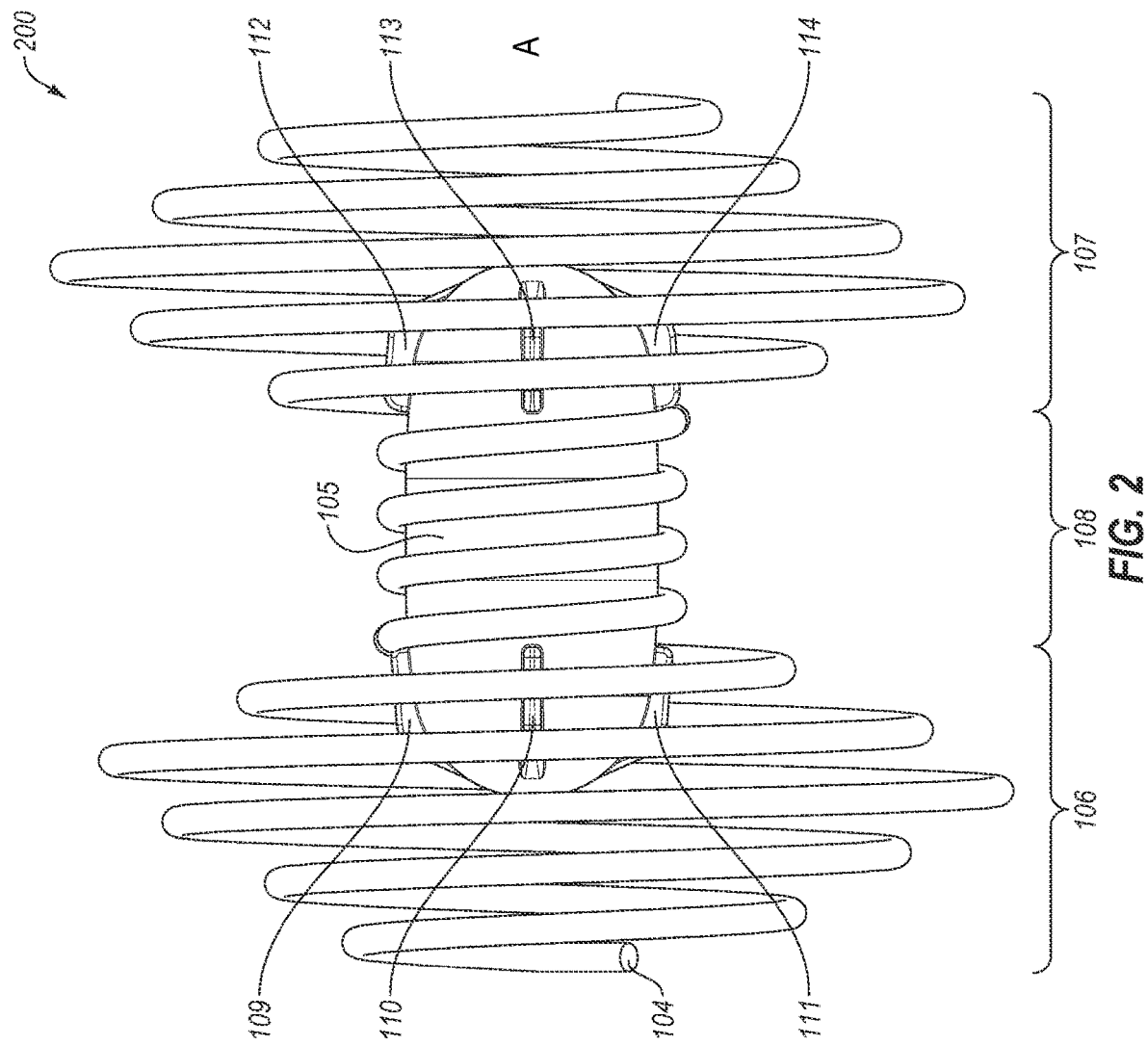
FIG. 2 is a side view of a second embodiment of a mixing device with an agitator and weighted member.
Figure 3:
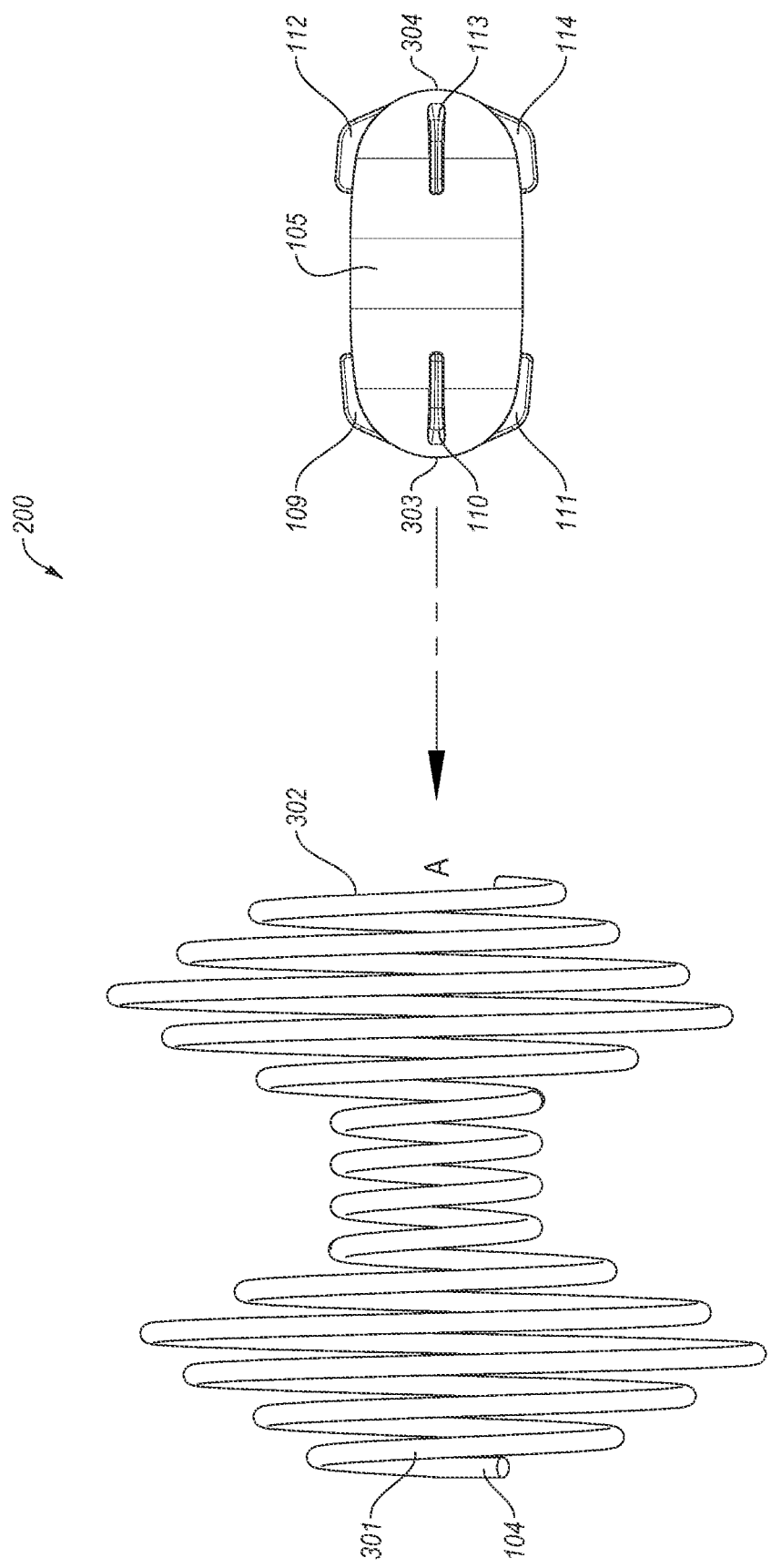
FIG. 3 is a side, exploded view of a second embodiment of a mixing device with an agitator and weighted member.
Figure 4:
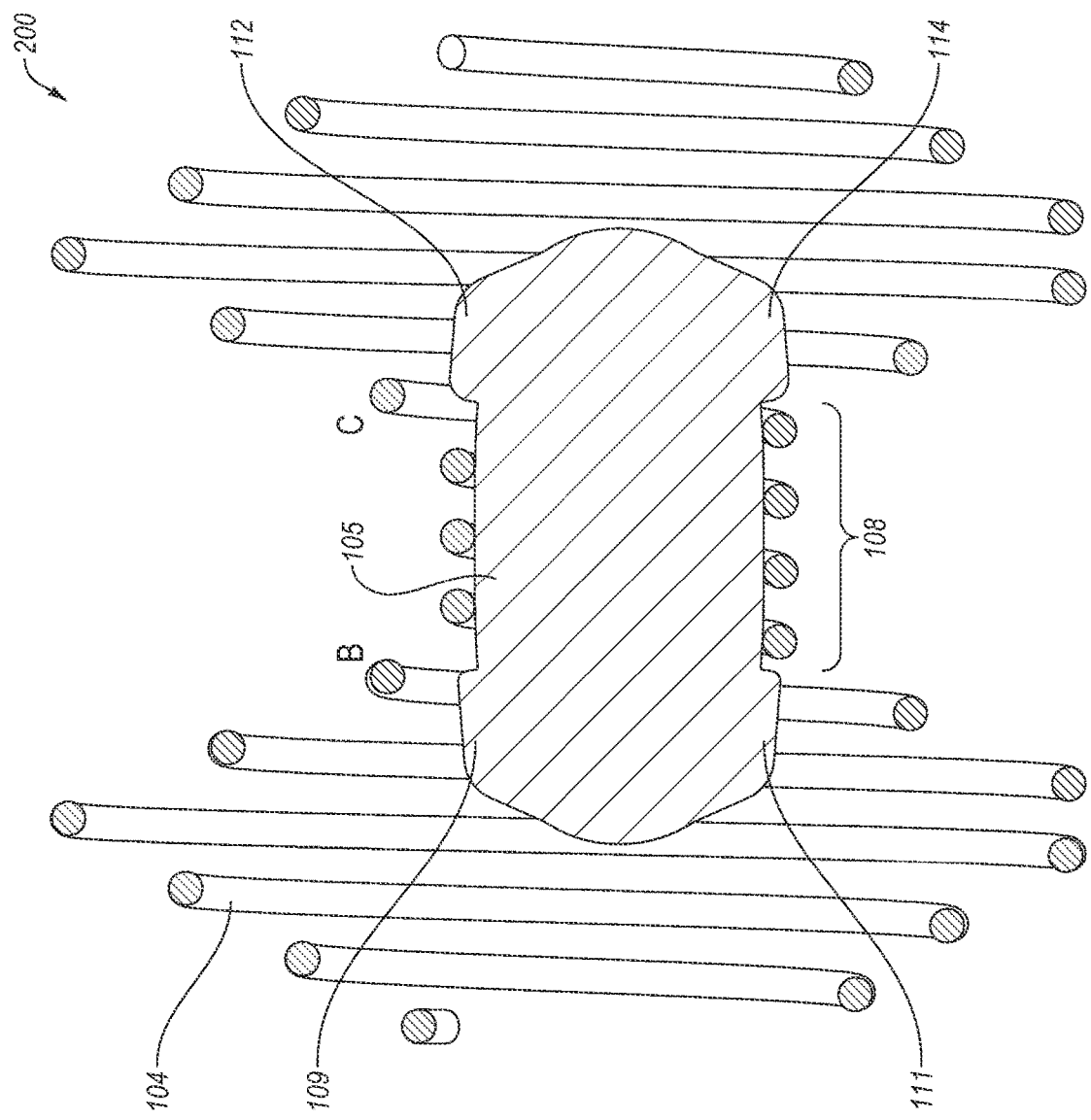
FIG. 4 is a side, cross-section view of a second embodiment of a mixing device with an agitator and weighted member.

Referring now to FIGS. 2 through 4, in the illustrated embodiment, dumbbell-shaped agitator 104 may be a type of compressible, spiraled spring structure. Dumbbell-shaped agitator 104 has first 106 and second 107 ends with a connecting portion 108 in between. First 106 and second 107 ends generally have larger diameters than the connecting portion 108. Dumbbell-shaped agitator 104 may also have a central passageway A within the connecting portion 108. Agitator ends 106, 107 extend beyond weighted member ends to prevent and/or reduce weighted member 105 impacts against the container interior when the mixing device is being shaken by a user. Agitators may have weight ranges of between around 15 grams to around 30 grams.

In preferred embodiments, weighted member 105 is not comprised of detachable parts and does not have voids. Rather, weighted member 105 is a single, solid piece constructed of, for example, metal, plastic, or other suitable material. Simplified single-piece construction makes the mixing device easy to clean and resistant to parts breakage and resulting choking/safety concerns. Weighted member 105 may be, e.g., torpedo-shaped, oblong, spheroid, ellipsoid, rectangular, cylindrical and/or elongate. Weighted member 104 may also have one or more ends 303, 304 that are narrower than a middle portion of the weighted member to achieve a streamlined shape.

One or more retention members 109, 110, 111, 112, 113, 114 are disposed on weighted member 105, the retention members outwardly extending, and configured to retain the weighted member 105 within the agitator 104 and/or central passageway A. Across embodiments, retention members may vary in number or orientation. For example, weighted member 105 may have a first end 303 with one or more retention members 109, 110, 111 and a second end 304 with one or more retention members 112, 113, 114. The weighted member of the illustrated embodiment has first and second sets of four equidistant retention members, each retention member oriented parallel to a longitudinal axis of the weighted member 104. Combining a streamlined weight with such retention members increases mixing device velocity and enhances mixing effectiveness. Retention members may have generally sloping or generally right angle leading or trailing edges to facilitate or act against insertion and/or removal. In preferred embodiments, the weighted member 105 has an overall weight of between 20 grams and 70 grams.

Weighted member 105 is insertable into agitator central passageway A through first 301 and/or second 302 agitator apertures respectively adjacent to first 106 and/or second 107 agitator ends. Insertion is accomplished with some application of force and a small diameter expansion of the central passageway A due to yield in the connecting portion 108. Once pushed into and centrally positioned within the agitator 104, central passageway A contracts and retention members 109, 110, 111 create a first fixed catch to retain the weighted member 105 adjacent to central passageway first end B; other retention members 112, 113, 114 create a second fixed catch to retain the weighted member 105 adjacent to central passageway second end C.

Figure 6:
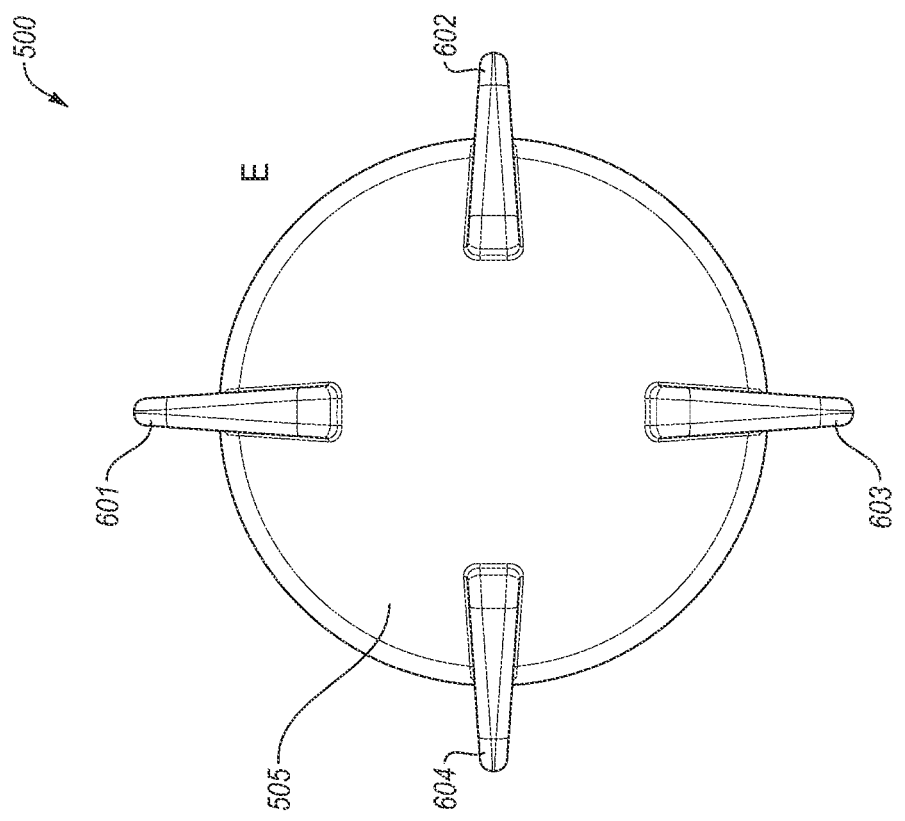
FIG. 6 is a back view of a third embodiment of a mixing device with weighted member.
Figure 5:
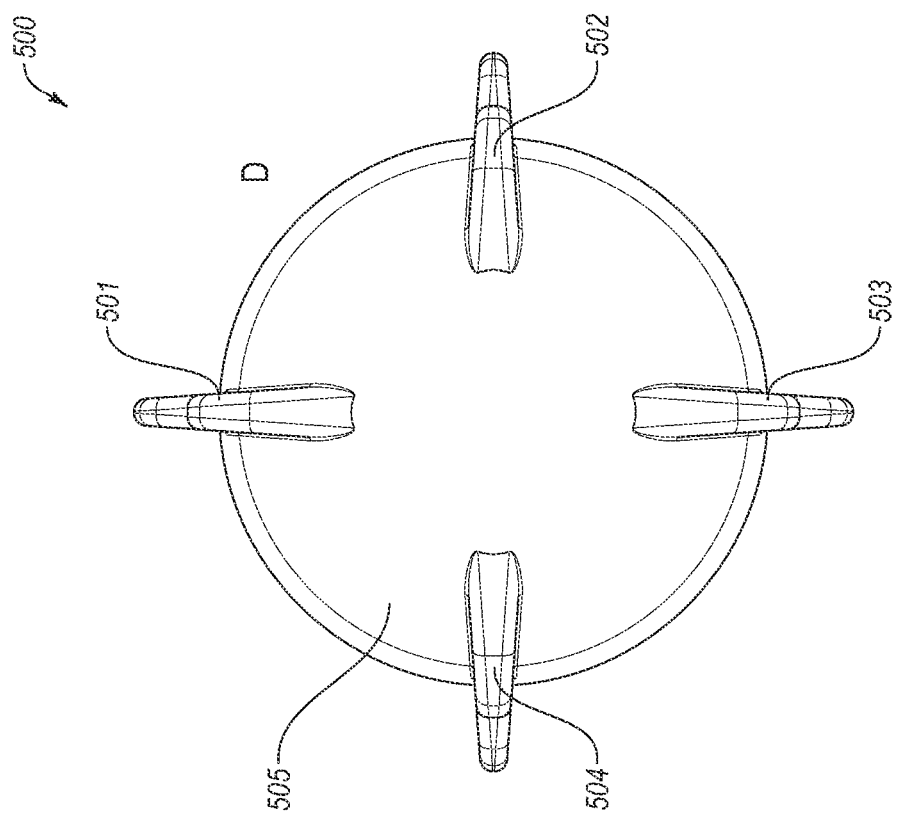
FIG. 5 is a front view of a third embodiment of a mixing device with weighted member.
Figure 7:
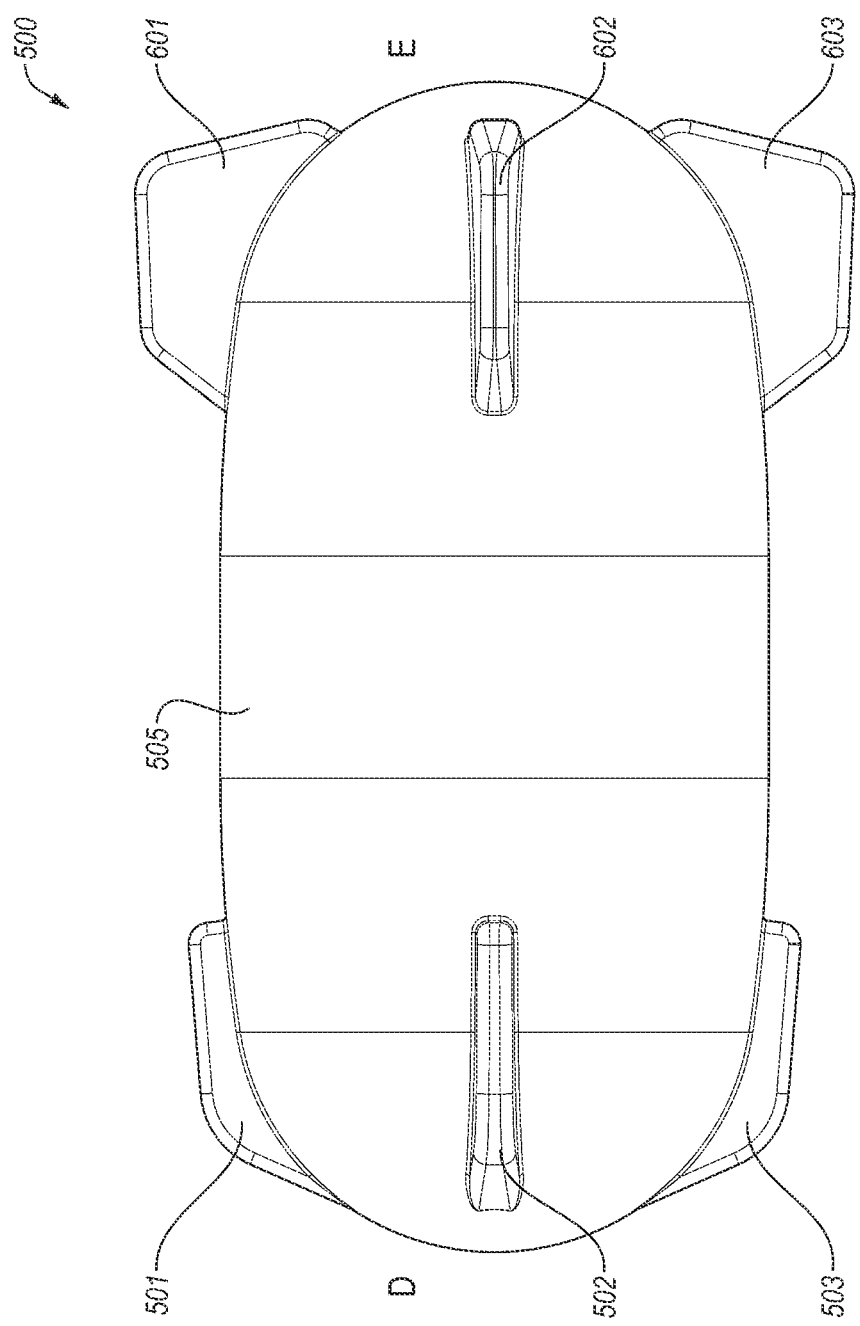
FIG. 7 is a side view of a third embodiment of a mixing device with weighted member.
Figure 9:
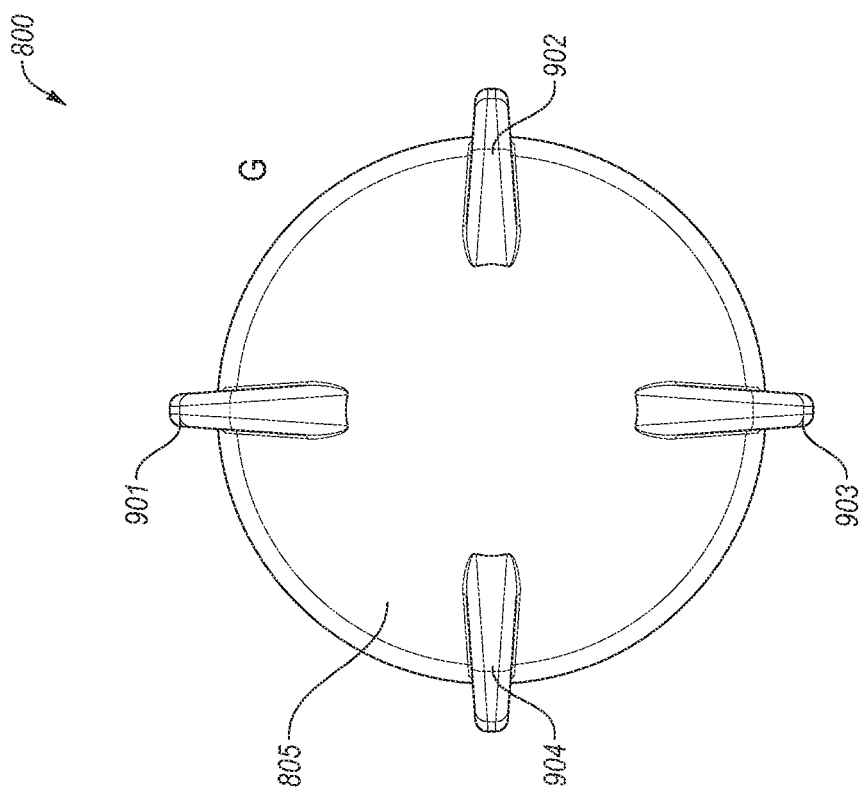
FIG. 9 is a back view of a third embodiment of a mixing device with weighted member.
Figure 8:
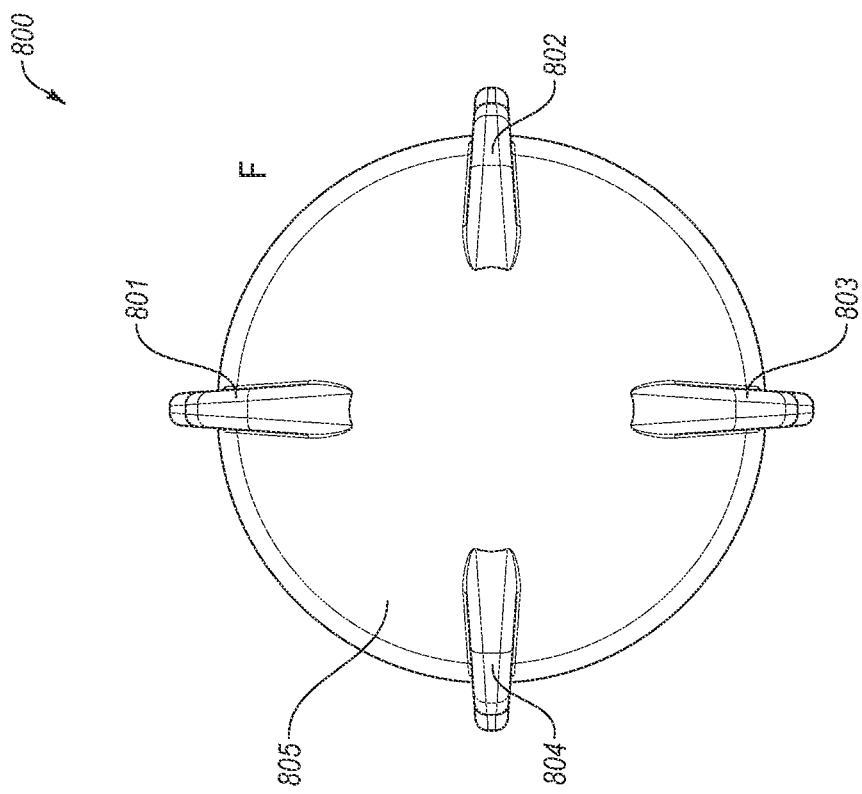
FIG. 8 is a front view of a third embodiment of a mixing device with weighted member.
Figure 10:
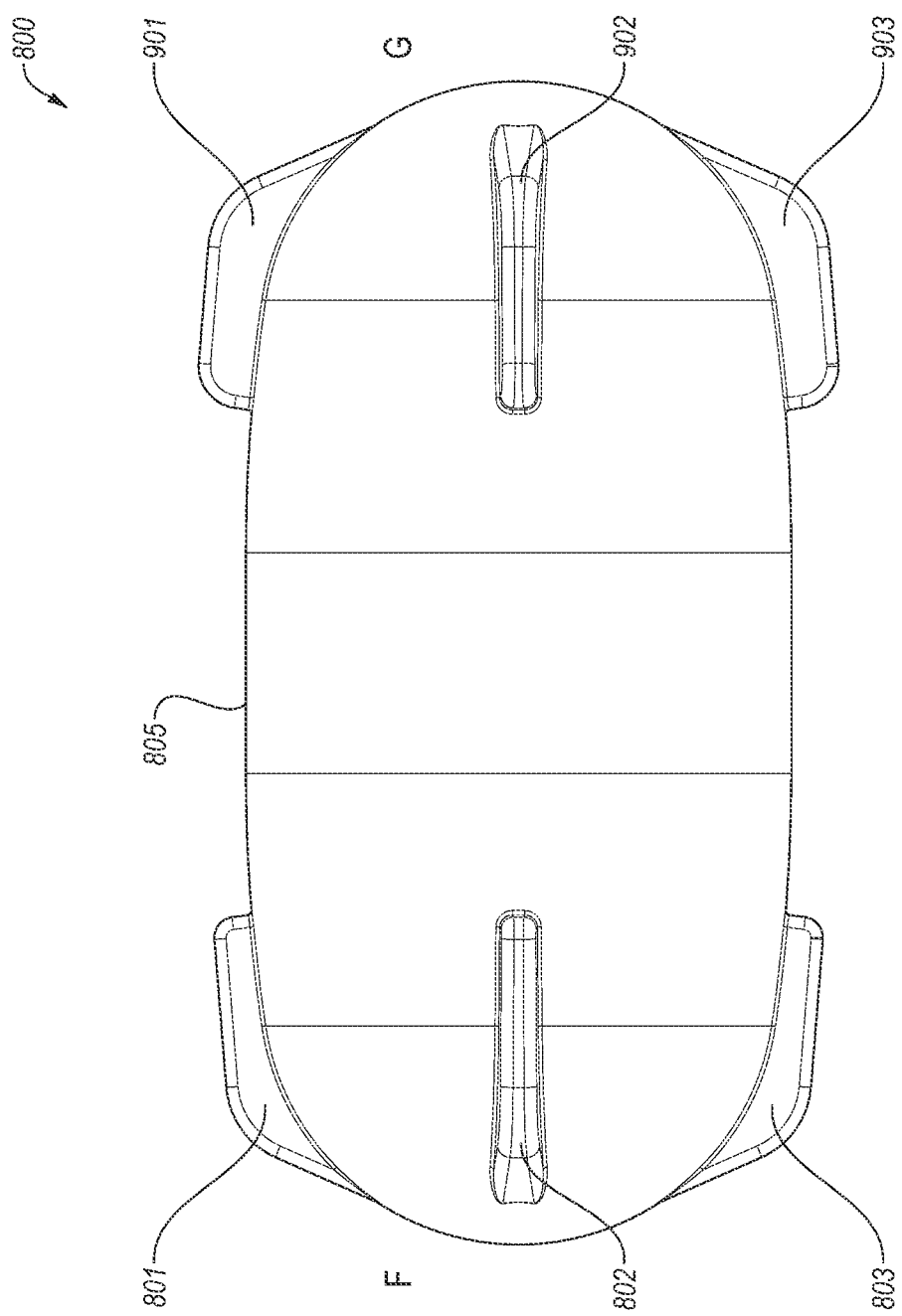
FIG. 10 is a side view of a third embodiment of a mixing device with weighted member.
Figure 11:
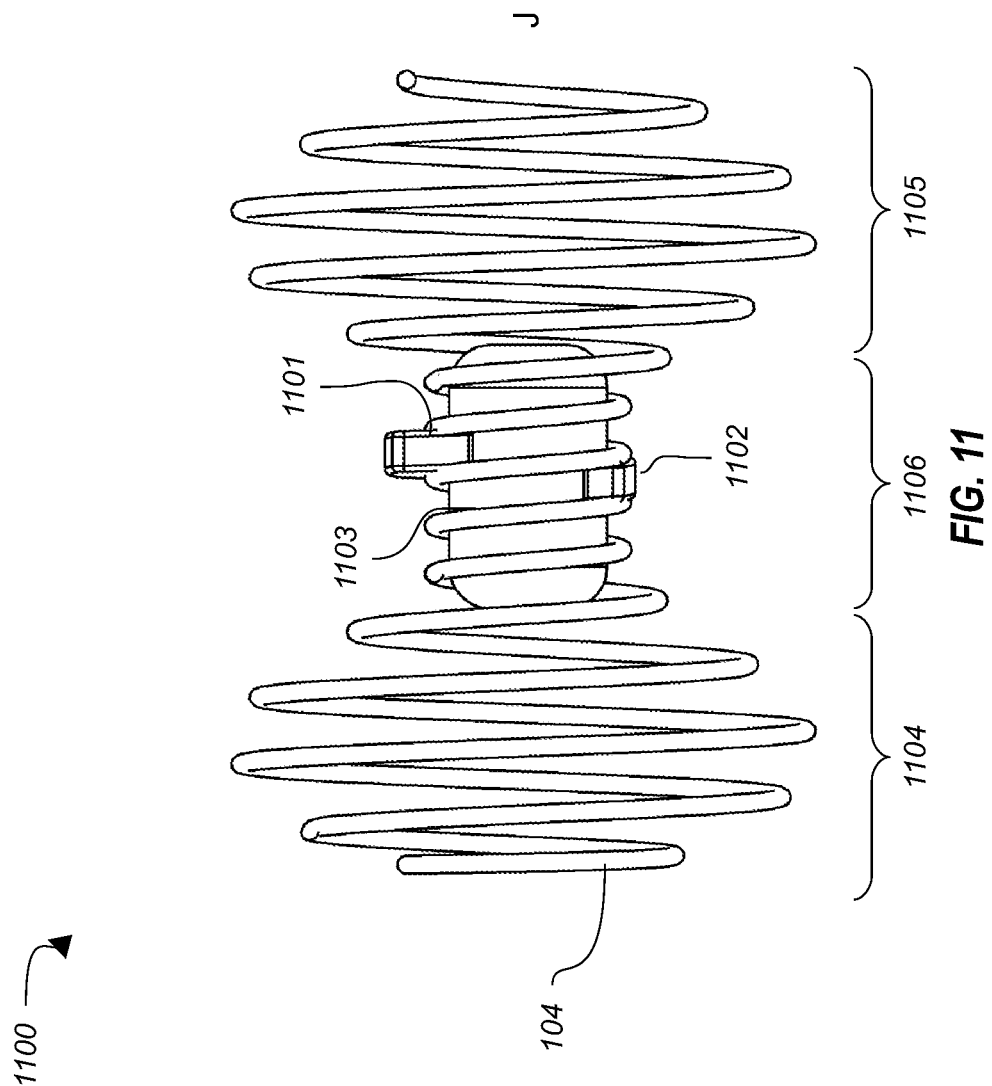
FIG. 11 is a side view of a fourth embodiment of a mixing device with an agitator and weighted member.
Figure 12:
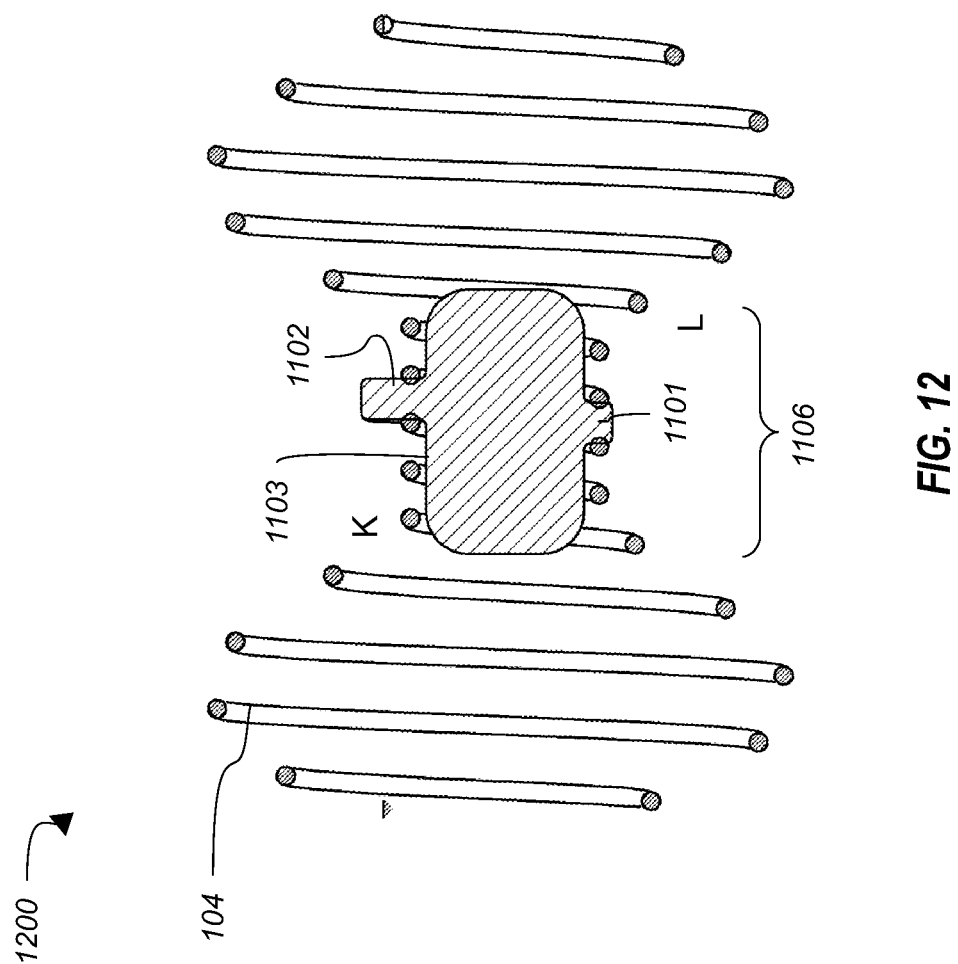
FIG. 12 is a side, cross-section view of a fourth embodiment of a mixing device with an agitator and weighted member.

Referring briefly to FIGS. 5-10, various embodiments of the mixing device and/or weighted member are shown in more detail. In the embodiment of FIGS. 5 through 7, the weighted member 500 has a first set of four equidistant retention members 501, 502, 503, 504 adjacent a first end D of the weighted member 500 and a second set of four equidistant retention members 601, 602, 603, 604 adjacent a second end E of the weighted member 500. Similarly, in the embodiment of FIGS. 8-10, the weighted member 800 has a first set of four equidistant retention members 801, 802, 803, 804 adjacent a first end F of the weighted member 800 and a second set of four equidistant retention members 901, 902, 903, 904 adjacent a second end G of the weighted member 800. The number, positioning, and spacing of retention members or equivalent structures may vary without departing from the purpose and scope of the invention. For example, in FIGS. 1-10, retention members may be alternatively characterized as fins in their configuration; however, as described below, other embodiments have retention members of different configuration.

Referring now to FIGS. 11-17, additional embodiments of the mixing device and/or weighted member are shown in more detail. Such embodiments may include dumbbell-shaped agitator 104 with first 1104 and second 1105 ends and a connecting portion 1106 in between. First 1104 and second 1105 ends generally have larger diameters than the connecting portion 1106. Dumbbell-shaped agitator 104 may also have a central passageway J within the connecting portion 1106 configured to releasably retain a weighted member 1103. Agitator ends 1104, 1105 extend beyond weighted member ends to prevent and/or reduce weighted member impacts against the container interior when the mixing device is being shaken by a user. Agitators may have weight ranges of between around 15 grams to around 30 grams.

In the embodiment of FIGS. 11 through 17, weighted member 1103 has first 1101 and second 1102 opposing retention members located on a side between first H and second I ends of the weighted member 1103. Retention members 1101, 1102 may be generally perpendicular to a longitudinal axis of the weighted member 1103. Retention members may be co-elevational or, alternatively, located at different elevations with respect to a longitudinal axis of the weighted member. Retention members may also differ in length, for example, in distal length with respect to a side of the weighted member. Retention members may also be slightly angled with respect to perpendicular to a longitudinal axis of the weighted member in order to achieve a propeller-type and/or basic threading configuration whereby a user may rotate the weighted member into and/or out of the springs of the agitator. Angles of retention members may be more extreme than those of adjacent agitator springs to bias the springs for enhanced retention during operation. Significantly, the retention members of this embodiment are also centrally located to facilitate a weighted member configuration that is optimally recessed from agitator ends to prevent the weighted member from damaging a container when in operation. Again, the number, positioning, and spacing of retention members or equivalent structures may vary without departing from the purpose and scope of the invention. In embodiments of this style (and others), agitator ends may be wider in diameter than the central passageway in order to facilitate insertion and removal of the weighted member.

Figure 18:
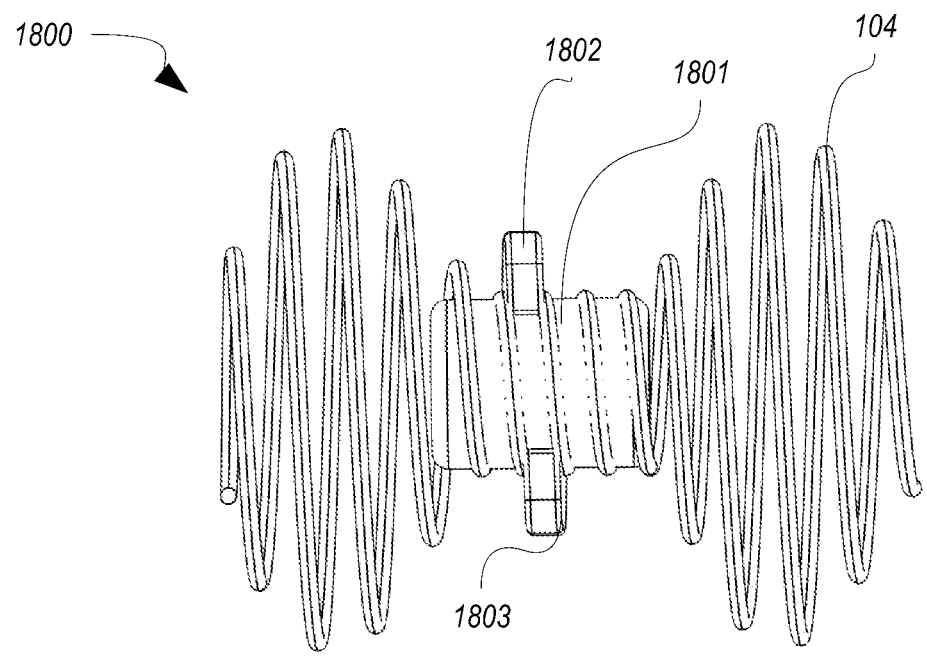
FIG. 18 is a side view of a sixth embodiment of a mixing device with weighted member.
Figure 19:
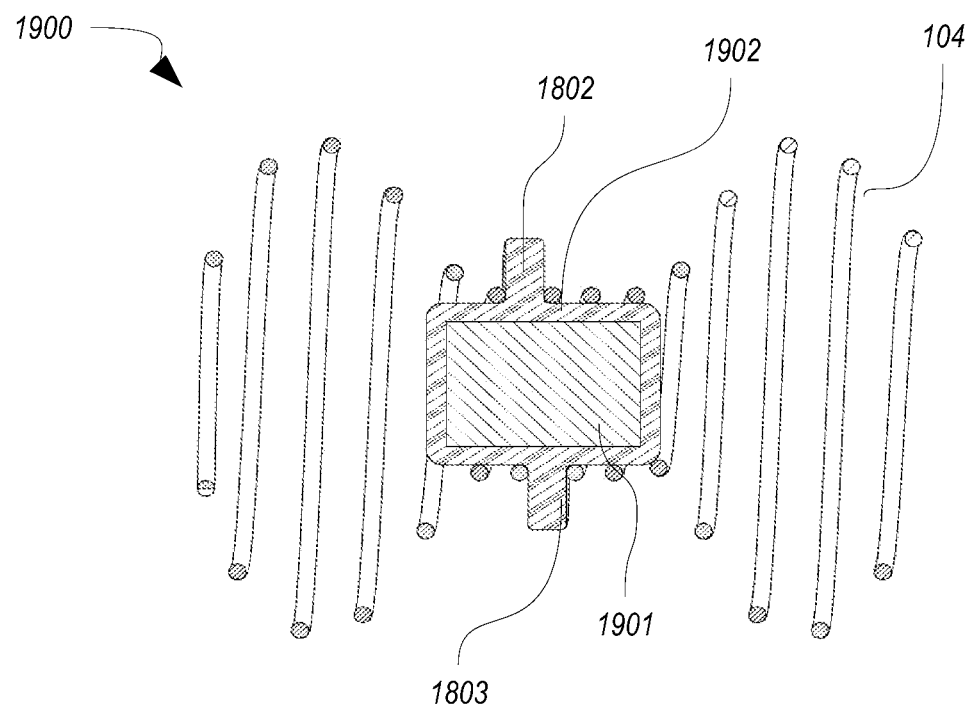
FIG. 19 is a side, cross-section view of a sixth embodiment of a mixing device with weighted member.

In the embodiment of FIGS. 18 and 19, weighted member 1801 has first 1802 and second 1803 opposing retention members located on a side between weighted member ends. In this embodiment, the weighted member 1801 is comprised of a metal core 1901 with a polymer exterior 1902. Embodiments of this type with a weighted member 1801 having a relatively heavy core enclosed by a softer surface (e.g. polymer exterior) provide a number of additional advantages. First, the softer surface reduces the impact and damage to the container that may be caused by the weighted member, thereby increasing container and/or product life. Second, the softer surface reduces the likelihood of container particles breaking off from the container from impact and subsequently being ingested by a user, therefore providing potential health and safety benefits. Third, a softer and/or polymeric surface facilitates weighted member insertion into and removal from the agitator. Fourth, the softer surface provides a quieter mixing experience when the agitator with and weighted member are shaken/in operation with a container. Fifth, softer surface construction is a more cost-effective solution because it is less expensive than full metal construction. Sixth, a polymer exterior avoids metallic taste, rust, and potentially other residues that would otherwise occur with a metal surface.

So configured, mixing device provides optimized mixing capability through a unique structure—for example, with opposing spring agitator frameworks joined by a streamlined weight—that also enhances mixing device momentum (or mass times velocity achieved by a user's shaking). This increases the effectiveness of the mixing device for mixing things like protein powder supplements, but also widens the range of mixable material for such a device to include, for example, ingredients like banana, avocado, thick dressings, thick cake batters. The structure of the mixing device is configured to provide specific benefits within the fluid dynamic s environment encountered in shaker bottles or containers largely filled with liquids and/or a mixture of liquids, solids, and/or powders. For example, in order to achieve adequate mixing, users of existing shaker bottles will often only partially fill the bottles (leaving airspace) in an effort to optimize the velocity component of momentum to achieve good mixing. The added density of the weighted member increases the momentum of the agitator in more fluid environments, thereby optimizing the mass portion of momentum and minimizing the need for airspace and velocity. So, with the additional mass of the weighted member, users can achieve good mixing when the bottle is more full with liquids, etc.

The present invention may be embodied in other specific forms without departing from its spirit or essential characteristics. The described embodiments are to be considered in all respects only as illustrative and not restrictive. As merely one example, herein, the agitator may be described as dumbbell-shaped when the invention may be implemented in many other agitator shapes more broadly stated as having a center portion, a first distal portion, and a second distal portion, the first and second distal portions having diameters generally larger than a diameter of the center portion. In another example, the weighted member may have one or more retention members, and not two or more retention members. The scope of the invention is, therefore, indicated by the appended claims rather than by the foregoing description. All changes which come within the meaning and range of equivalency of the claims are to be embraced within their scope.

I claim:

1. A mixing device comprising:
   an agitator insertable within a hand-held, shakeable container and composed of a framework comprising a single compression spring arranged to provide voids between coils thereof to allow for flow of one or more of liquids, powders, and other materials into and out of portions of the agitator, the agitator having a center portion, a first distal portion, and a second distal portion, the first and second distal portions having diameters generally larger than a diameter of the center portion; and
   an elongated weighted member removably and threadedly affixed to the center portion of the compression spring of the framework and having one or more retention members configured to thread to and retain the weighted member within the agitator.

2. The mixing device of claim 1, the weighted member further formed as a substantially solid piece without external voids.

3. The mixing device of claim 1, the one or more retention members oriented generally at an angle to a longitudinal axis of the weighted member and extending outward from a center portion thereof.

4. The mixing device of claim 1, the weighted member comprised of a metal core with a polymer exterior.

5. The mixing device of claim 1, wherein the first and second distal portions of the agitator extend beyond the weighted member ends and are configured to generally prevent the weighted member from striking a shakeable container interior when the mixing device is in operation.

6. The mixing device of claim 5, the first and second distal portions comprising compressible spring ends.

7. A mixing device comprising:
   a container for holding liquids, the container configured to be hand-held and shakeable;
   an agitator insertable within the container and composed of a framework arranged to provide voids to allow for flow of one or more of liquids, powders, and other materials into and out of portions of the agitator, the agitator having a center portion, a first distal portion, and a second distal portion, the first and second distal portions having diameters generally larger than a diameter of the center portion; and
   an elongated weighted member removably and threadedly affixed to the center portion of the agitator, the weighted member comprising only a single piece without external voids and having one or more retention members oriented generally perpendicular to a longitudinal axis of the weighted member and configured to thread to and retain the weighted member within the agitator;
   the framework further comprising a single compression spring with compressible spring ends that extend beyond weighted member ends, the compressible spring ends configured to generally prevent the weighted member from striking the shakeable container interior when the mixing device is in operation.

8. The mixing device of claim 3, wherein the one or more retention members comprise a first set of retention members with a thickness exceeding a space between adjacent coils of the compression spring of the agitator, thereby threading of the weighted member into the coils of the single compression spring causes longitudinal expansion of the compression spring coils located in contact with the first set of retention members to facilitate the affixed connection between the weighted member and the framework of the agitator.

9. The mixing device of claim 8, wherein the first set of retention members comprises a first retention member extending on one side of the weighted member and a second retention member extending on another side of the weighted member opposite the first retention member, wherein the second retention member extends further away from the weighted member than the first retention member.

10. The mixing device of claim 7, wherein the weighted member comprises a coated metal core.

11. The mixing device of claim 10, wherein the weighted member comprises a metal core with a polymer exterior.

12. A mixing device comprising:
an agitator insertable within a hand-held, shakeable container and composed of a framework comprising a single compression spring arranged to provide voids between coils thereof to allow for flow of one or more of liquids, powders, and other materials into and out of portions of the agitator, the agitator having a center portion, a first distal portion, and a second distal portion, the first and second distal portions having diameters generally larger than a diameter of the center portion; and
an elongated weighted member removably and threadedly affixed to the center portion of the compression spring of the framework and having one or more retention members configured to thread to and retain the weighted member within the agitator,
wherein once threaded into the single compression spring of the agitator, the weighted member is retained within thereof by the one or more retention members forming an interference fit between adjacent coils of the single compression spring.

13. The mixing device of claim 12, the one or more retention members oriented generally at an angle to a longitudinal axis of the weighted member and extending outward from a center portion thereof, the one or more retention members are configured to bias adjacent coils of the single compression spring for enhanced retention of the weighted member therein.

14. The mixing device of claim 12, the weighted member is a single piece comprised of a metal core with a polymer exterior.

* * * * *